Inventor
Harry B. Patten
By his Attorney

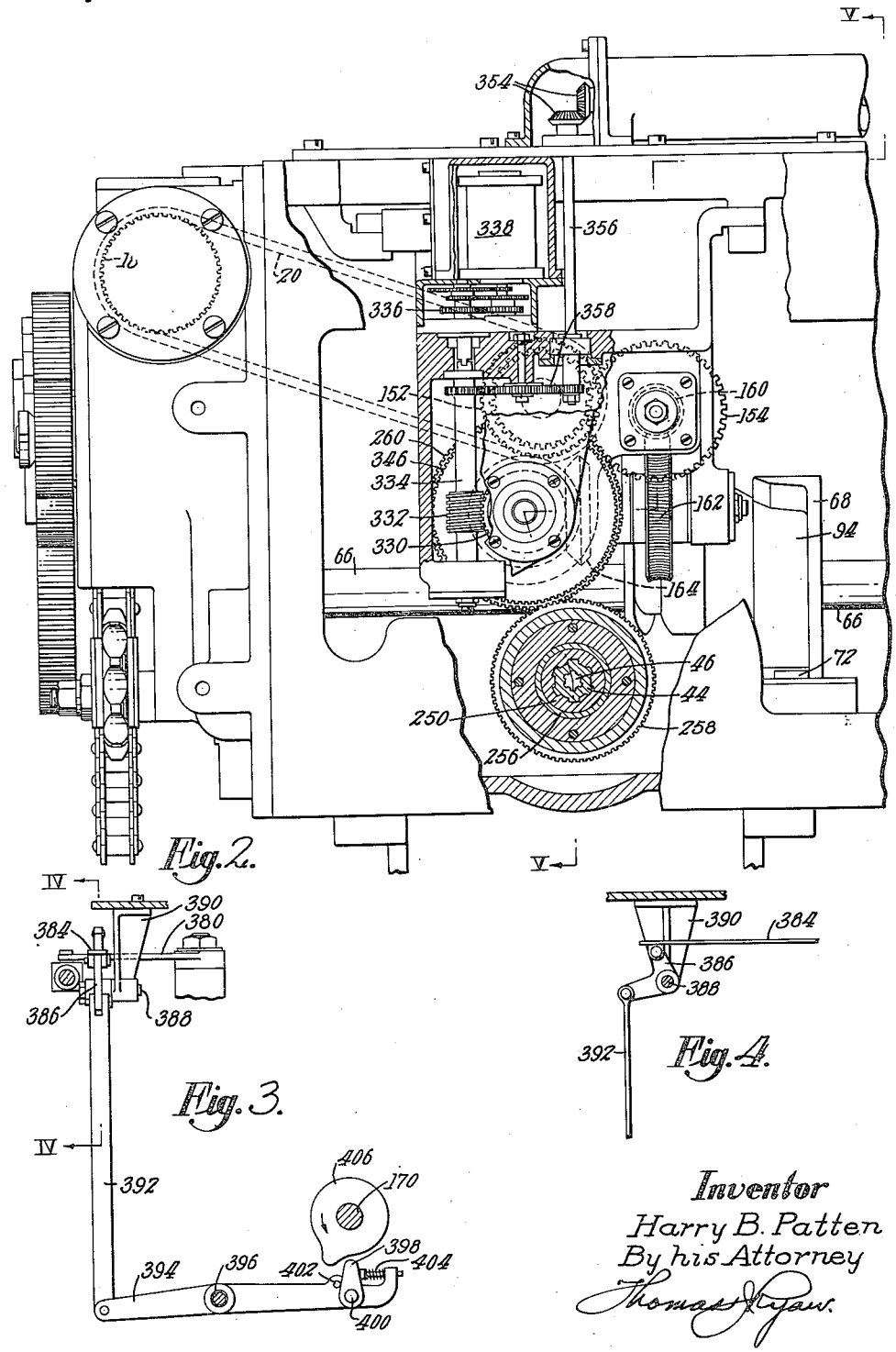

Jan. 30, 1962  H. B. PATTEN  3,018,693

FUSE-SETTING MECHANISM

Filed April 4, 1946 9 Sheets-Sheet 3

Inventor
Harry B. Patten
By his Attorney
Thomas Ryan.

Jan. 30, 1962

H. B. PATTEN 3,018,693

FUSE-SETTING MECHANISM

Filed April 4, 1946

Inventor
Harry B. Patten
By his Attorney
Thomas Ryan

Jan. 30, 1962   H. B. PATTEN   3,018,693
FUSE-SETTING MECHANISM
Filed April 4, 1946   9 Sheets-Sheet 5

Inventor
Harry B. Patten
By his Attorney
Thomas J. Ryan.

Inventor
Harry B. Patten
By his Attorney
Thomas Ryan

Jan. 30, 1962   H. B. PATTEN   3,018,693
FUSE–SETTING MECHANISM
Filed April 4, 1946   9 Sheets–Sheet 7

*Inventor*
*Harry B. Patten*
*By his Attorney*
*Thomas Ryan*

Inventor
Harry B. Patten
By his Attorney
Thomas Ryan.

Inventor
Harry B. Patten
By his Attorney

United States Patent Office 3,018,693
Patented Jan. 30, 1962

3,018,693
FUSE-SETTING MECHANISM
Harry B. Patten, Beverly, Mass., assignor to United Shoe Machinery Corporation, Flemington, N.J., a corporation of New Jersey
Filed Apr. 4, 1946, Ser. No. 659,548
16 Claims. (Cl. 89—6)

This application relates to apparatus for operating on work pieces and is illustrated herein as embodied in a machine for setting the fuses of shells.

An object of the invention is to provide improved mechanism for moving a work-engaging member into one of a plurality of operating positions in accordance with the position of a work piece to be operated upon. More specifically, it is an object of the present invention to provide in a fuse-setting mechanism improved means for moving the fuse cutter head thereof into operative relationship with the nose of a shell, the fuse of which is to be set.

The invention is illustrated herein as embodied in a fuse-setting mechanism arranged to operate on shells of different lengths, the shells being so supported that the noses occupy different lengthwise positions relatively to the fuse cutter head when in its retracted position. In accordance with a feature of the invention the fuse cutter head is moved a predetermined distance toward the shell by positive drive means whereupon it becomes free of the drive means and is moved the remainder of the distance into engagement with the nose of the shell by a spring. Movement by the spring insures firm engagement of the nose by the fuse cutter head and provides for variable movement of the head in accordance with the length of the shell.

Following the fuse-setting operation, the shell is withdrawn and loaded into the gun. To prevent the fuse cutter head from following the shell under the influence of the spring while the shell is being withdrawn from the head and in accordance with a further feature of the invention the head is locked in position against the force of the spring after it has moved into engagement with the shell.

The above and other features of the invention, including various novel details of construction and combinations of parts will now be described in detail and pointed out in the claims.

In the drawings,

FIG. 2 is a front elevation partly in section of the fuse-setting mechanism of FIG. 1;

FIG. 3 is a section on the line III—IIII of FIG. 5;

FIG. 4 is a section on the line IV—IV of FIG. 3;

Figure 1:
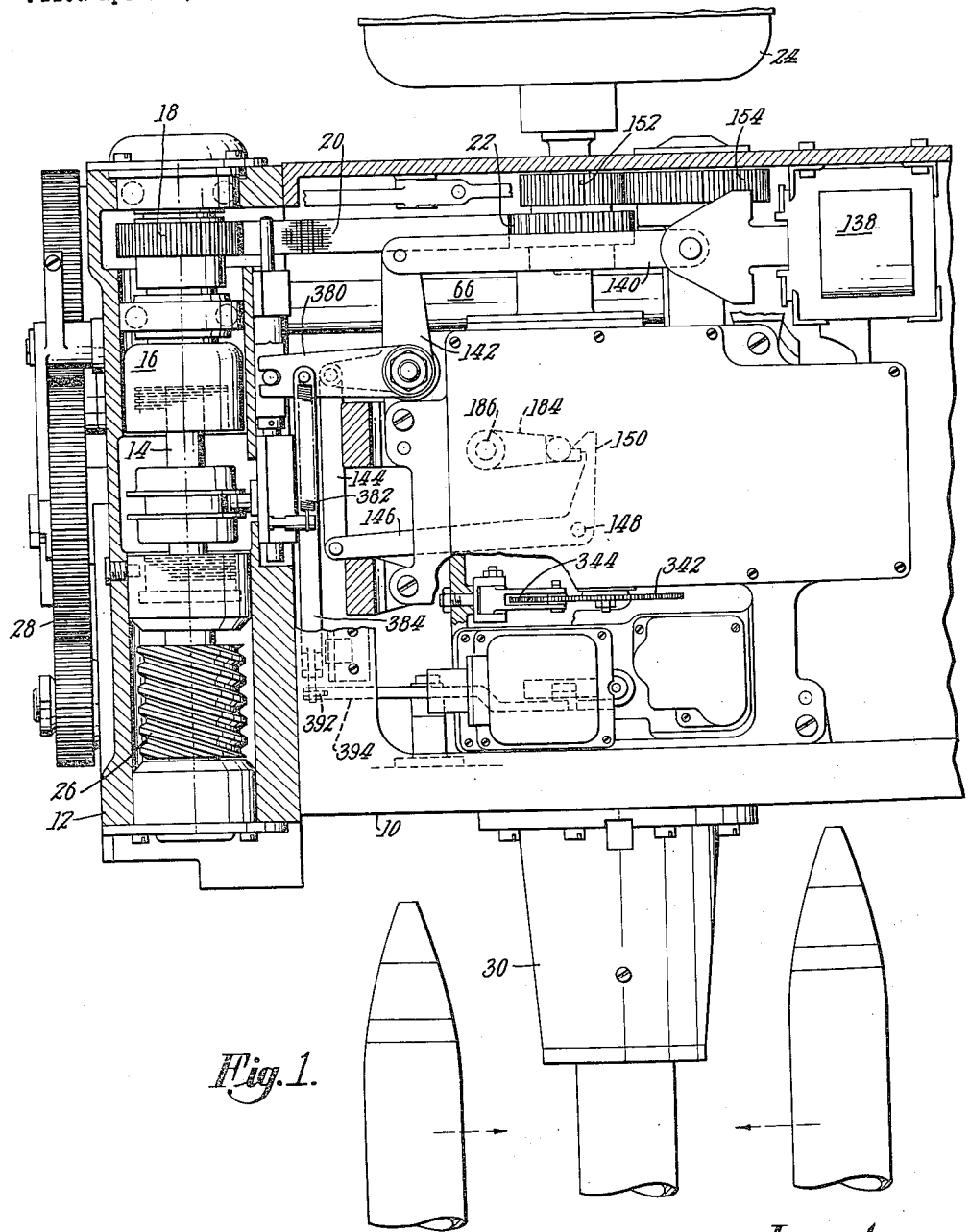
FIG. 1 is a plan view partly in section of one form of fuse-setting mechanism in which the invention is embodied.

The invention is illustrated as embodied in a fuse-setting mechanism which may be employed in connection with apparatus for transporting a shell at the conclusion of a fuse-setting operation into the breech chamber of a gun. One type of apparatus with which the fuse-setting mechanism may be employed is illustrated in application for Letters Patent of the United States, Serial No. 655,704, filed March 20, 1946, now U.S. Patent No. 2,975,678, in the name of Sidney J. Finn. The fuse-setting mechanism is carried by a housing 10 (FIG. 1) which may be supported on the gun carriage above the breech end of the gun. On one side of the housing 10 is a gear housing 12 in which is carried a shaft 14 which may be connected by a clutch 16 to a gear 18 which is in turn connected by a chain 20 to a gear 22 on the shaft of a constantly operating motor 24. At the conclusion of a fuse-setting operation, the clutch 16 is engaged providing conditions are such that the shell should be rammed into the gun. The rearward end of the shaft carries a worm 26 which is connected to gearing 28 as illustrated and described in the above identified application, and which, as further described therein, operates the loading and ramming mechanisms. Inasmuch as this portion of the mechanism forms no part of the present invention, it is not being described in detail, but for a full description thereof, reference may be had to the aforementioned application.

Extending rearwardly from the front wall of the housing 10 is a support 30 (FIG. 5) for a fuse cutter head 31 by which the fuse ring of the shell is turned in the fuse-setting operation. This support is provided with cutaway portions in its opposite sides, as shown most clearly in FIG. 6, to permit entry of a shell from either side of the support 30, as indicated in FIG. 1. The shells may be automatically fed into fuse-setting position by apparatus shown and described in the aforementioned Finn application. Slidable in the support 30 is a carriage 32 for the fuse cutter head to the rearward end of which are secured semicircular supports 34 carrying three sets of inwardly extending knives 36, as shown most clearly in FIG. 6. These knives are arranged to dig into the shell rearwardly of the fuse ring when the head is moved rearwardly into the position shown in FIG. 5 thereby to hold the shell against rotation during the fuse-setting operation. Rotatable in the carriage just forwardly of the supports 34 is a generally conical pawl support 38 which is arranged to enclose the nose of the shell when the support 38 is moved into the position shown in FIG. 5. This support is provided with a series of pawls 40 (FIG. 6) carried by pins 42 and spring urged inwardly toward the fuse ring of the shell. The pawl support is formed at the rearward end of a forwardly extending hollow splined shaft 44 which at its forward end has an internal splined portion into which fits a second splined shaft 46 journaled at its forward end in a bearing 48 carried by the forward wall of the housing 10.

The forward end of the carriage 32 has a reduced cylindrical portion on which is slidably mounted a ring 50 forming an abutment for a spring 52 between the ring and the carriage 32. The ring 50 is slidable in the support 30 and has secured to its upper portion a plate 54 provided with an opening for the reception of a ball 56 which is bigger in diameter than the thickness of the plate, the reason for which will appear as the description proceeds. The adjacent wall of the carriage 32 has a recess 58 which is arranged to underlie the ball 56 when the fuse cutter head is in its forward position and until the last part of the movement of the head into engagement with the nose of the shell so that the carriage and ring are locked together against relative movement. Secured internally to the upper portion of the support 30 is a plate 60 provided with a recess for receiving a portion of the ball 56 when the parts are in the positions shown in FIG. 5.

The purpose of the arrangement described above is to permit the fuse cutter head to be moved different distances depending upon the length of the shell to be operated upon. At the beginning of the fuse-setting operation it will be understood that the splined shaft 44 is in a position forwardly of that illustrated herein. As the shaft is moved forwardly to carry the fuse cutter head into retracted position, the carriage 32 moves relatively to the plate 54 and the ring 50 which is locked against movement by the ball 56 engaging the recess in the plate 60. This movement continues, compressing the spring 52, until the recess 58 at the rearward end of the carriage underlies the ball 56, whereupon the ball drops out of engagement with the recess in the plate 60 and frees the plate 54 for movement relatively to the support. The forward end of the carriage engages the rearward end of the ring and the two move as a unit into their forward positions. During the fuse-setting operation the carriage and the ring 50 are coupled together by the ball 56 which is in the recess 58 of the carriage whereupon the carriage and the ring 50 move as a unit upon the application of power to the shaft 44 until the ball 56 again reaches the position illustrated, at which time rearward movement of the plate 54 is positively prevented by engagement of its rearward end with plates 64 secured to the rearward end of the support 30. As soon as this point in its travel is reached, the carriage 32 is free to move rearwardly relatively to the plate 54 and the ring 50 under the force exerted by the spring 52. Consequently, the fuse cutter head is snapped by the action of the spring onto the nose of the shell until the knives 36 bite into the shell rearwardly of the fuse ring. It will thus be seen that regardless of the length of the shell, within certain limits, the fuse cutter head is moved by action of the spring 52 into fuse-setting position, but that this action of the spring takes place only during the latter part of the movement of the fuse cutter head.

Figure 30:
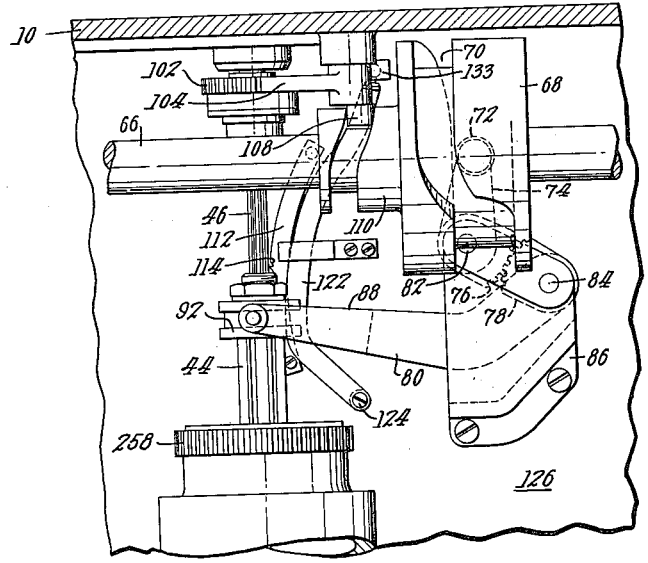
FIG. 30 is a plan view of the mechanism by which the fuse cutter head is moved initially into operative position on the nose of the shell.
Figure 31:
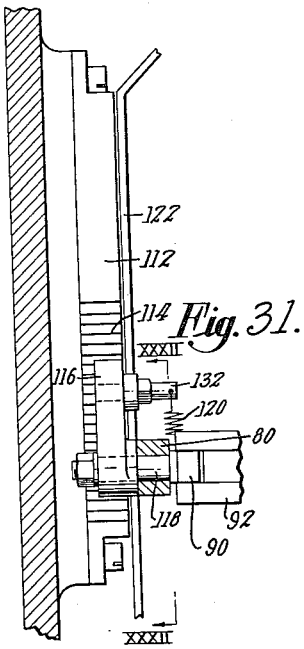
FIG. 31 is a side elevation partly in section of a portion of the mechanism of FIG. 30.

The movement of the fuse cutter head onto the nose of the shell takes place at the conclusion of a cycle of operations of the loading mechanism. The movement of the fuse cutter head with the ring 50 as a unit is effected from a cam shaft 66 (FIGS. 5, 29 and 30) which is driven by the gearing 28 (FIG. 1), as described in the Finn application. This cam shaft carries a cam 68 (FIGS. 29 and 30) in the cam track 70 of which is received a cam follower 72 carried at one end of an arm 74, secured to which is a gear segment 76. This segment meshes with a second gear segment 78 secured to an arm 80, the arms 74 and 80 being pivoted on pins 82 and 84, respectively, carried by a supporting plate 86. The arm 80 has a bifurcated end 88 carrying blocks 90 (FIG. 29) received between the flanges of a collar 92 secured to the forward end of the splined shaft 44. As noted most clearly in FIGS. 29 and 30, the cam track 70 in the cam 68 has a widened portion 94 which permits movement of the cam follower relatively to the cam during the final movement of the fuse cutter head by the spring 52 when the head is snapped onto the nose of the round. The cam follower is in the narrow portion of the cam track during the initial movement of the fuse cutter head toward the shell and enters the widened portion of the track coincidentally with the movement of the ball 56 (FIG. 5) into the recess in the plate 60 and out of locking engagement with the carriage 32 of the fuse cutter head.

After the fuse cutter head has been snapped onto the nose of the shell, the support 38 by which the pawls 40 are carried must be turned until one of the pawls moves into a recess 96 in the fuse ring, thereby to lock the fuse ring to the rotatable portion 38 of the fuse cutter head so that when this member is turned in the fuse-setting operation the fuse ring will be turned with it a like amount. This initial turning of the support 38 is made necessary by reason of the fact that the recess 96 will not always occupy the same position relatively to the fuse cutter head, the apparatus being so designed that the operator may insert the shell without any care as to the relative position of this recess and the fuse cutter head. For thus initially turning the member 38 to move one of the pawls into locking engagement with the recess 96, the forward end of the splined shaft 46 carries a gear 98 connected to the shaft by a plurality of friction disks 100, the arrangement being such that the disks may slip to permit turning of the gear relatively to the shaft 46 as soon as any appreciable resistance to turning of the shaft is encountered. When one of the pawls enters the recess 96 in the fuse ring the resistance to turning of the fuse ring will be sufficient to cause the disks to slip and permit the gear 98 to turn on the shaft 46. This arrangement permits the gear 98 to be rotated a fixed amount each time in the operation of the apparatus that the fuse cutter head is moved into engagement with a shell. A segment 102 meshes with the gear 98 and is carried by the lower end of an arm 104 pivoted at 106 to the forward wall of the housing 10. A cam follower 108 is carried by the arm 104 and is received by a groove in a cam 110 on the cam shaft 66. The groove in the cam 110 is so designed that the segment 102 is operated after the cam roll 72 enters the widened portion of the cam track in the cam 68 so that, following the movement of the fuse cutter head into engagement with the nose of the shell, the gear 98 at the forward end of the shaft 46 is turned a predetermined amount and the shaft 46 turns until one of the pawls 40 engages the recess 96 in the fuse ring. The apparatus then comes to rest with the parts in position to initiate a fuse-setting operation.

Figure 29:
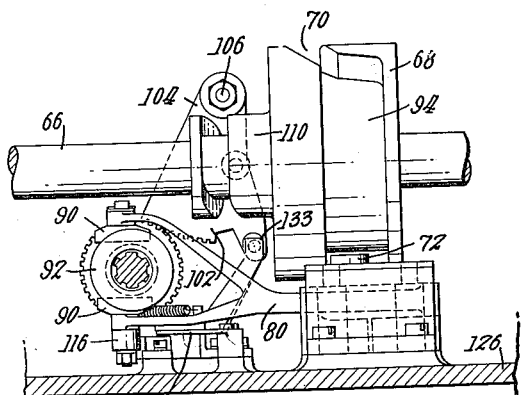
FIG. 29 is a section on the line XXIX—XXIX of FIG. 5.
Figure 32:
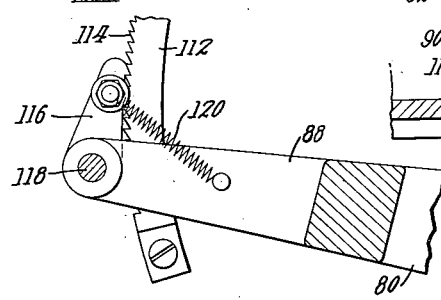
FIG. 32 is a section on the line XXXII—XXXII of FIG. 31.

After the fuse-setting operation has been completed by mechanism to be described, the shell is withdrawn from the fuse cutter head to be loaded into the gun. During this time it is important that the carriage 32 be locked against rearward movement by the spring 52 so that it will not follow the shell as it is moved rearwardly. For this purpose mechanism shown in FIGS. 29 to 32 is provided. Mounted adjacent to the splined shaft 46 is a curved bar 112 provided with ratchet teeth 114. A pawl 116 is pivoted on a pin 118 at the outer end of the arm 80 and is urged by a spring 120 into locking engagement with the teeth 114. When the pawl is permitted to engage the teeth, as shown in FIG. 32, it locks the arm 80 against counterclockwise movement, as viewed in FIG. 30, and since this arm is connected to the splined shaft 44 it prevents rearward movement of the carriage 32 carrying the fuse-setting elements. The pawl must be held out of engagement with the ratchet teeth until the fuse cutter head has completed its rearward movement into operative engagement with the shell. For this purpose an arm 122 pivoted at 124 to a supporting plate 126 is provided. This arm, when moved in a counterclockwise direction, as viewed in FIG. 30, engages a pin 132 (FIG. 31) to which the spring 120 is connected and moves the pawl 116 away from the bar 112. The forward end of the arm 122 extends upwardly, as shown in FIG. 29 and has a ball and socket connection 133 with a downward extension of the arm 104. Consequently, when the arm 104 is operated by the cam 110, the arm 122 is swung about its pivot 124, the arrangement being such that the arm 122 is swung into engagement with the pin 132 only at the conclusion of a fuse-setting operation and just prior to the withdrawal of a shell therefrom.

Figure 11:
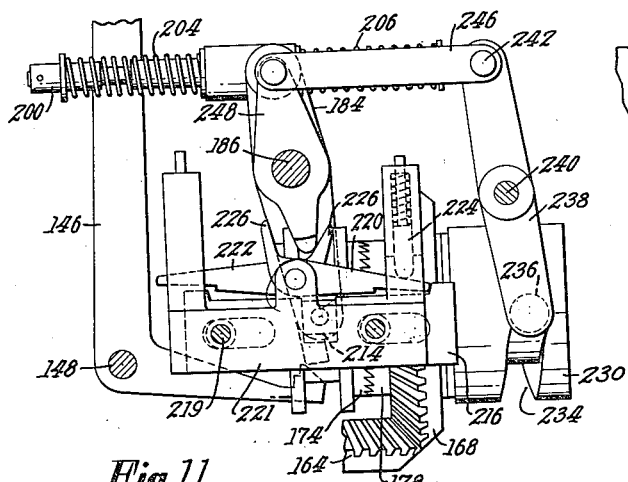
FIG. 11 is a view similar to FIG. 8 showing the position of the parts at the beginning of the fuse-setting operation.

The fuse setting operation is initiated by the closure of a switch which energizes a solenoid 138 (FIG. 1) the armature of which is connected by a link 140 to a bell crank lever 142 which is in turn connected by a link 144 to a latch 146. This latch is pivoted at 148 in the housing 10 and has an arm 150 which, when moved toward the right, as viewed in FIG. 1, permits closure of a clutch by which power is transmitted from the motor 24 to the fuse cutter head. A gear 152 on the armature of the motor meshes with a gear 154 on a shaft 156 (FIG. 5) which is coupled to a shaft 158 carrying a worm 160. This worm drives a worm gear 162 (FIG. 2) on a shaft carrying a bevel gear 164 (FIGS. 2 and 11). This bevel gear meshes with a pair of bevel gears 166, 168 rotatable on a forwardly and rearwardly extending shaft 170 which, by mechanism to be described, is connected to the splined shaft 44. Slidable on the shaft 170 and splined thereto is a saw-tooth clutch member 174 having oppositely disposed sets of teeth arranged for engagement with complementary clutch elements 176, 178 on the gears 166, 168 respectively. When the clutch member 174 is moved to the right from the position shown in FIG. 7 into the position shown in FIG. 11, the gear 168 is rotated to turn the shaft 170 in a direction to set the fuse of the shell. Upon shifting the clutch into its other extreme position the gear 166 is rotated to turn the shaft 170 back to its original position, which action takes place at the conclusion of the fuse-setting operation.

The clutch member 174 has a pair of spaced flanges 180 between which are received blocks 182 carried by a forked lever 184 pinned to a shaft 186. This lever is also provided with a pair of spaced arms 188 carrying inwardly extending pins 190 received by apertures 192 (FIG. 10) in a sleeve 194 mounted for sliding movement on a bushing 196 secured to the central portion of a rod 198. Fixed to opposite ends of the rod are spring abutments 200, 202 for engagement with the outer ends of springs 204, 206 the inner ends of which engage abutments 208, 210 respectively which are slidable along the rod 198.

Figure 8:
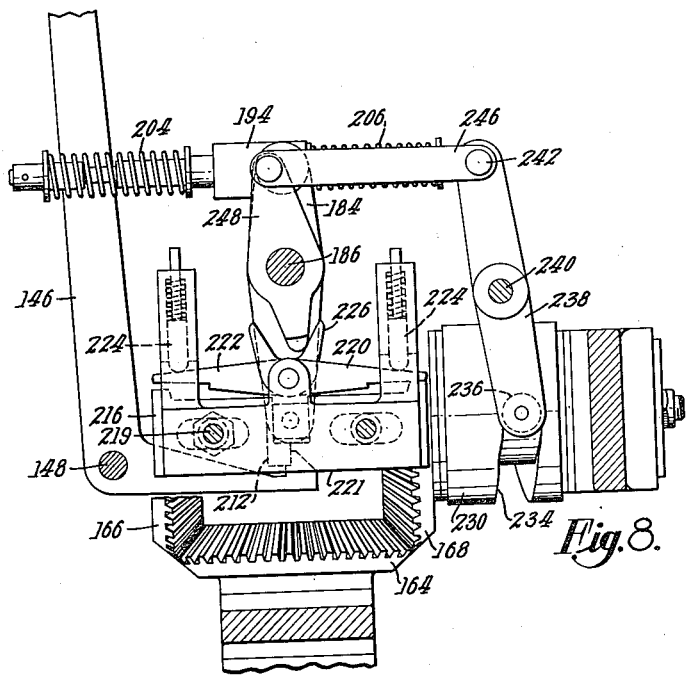
FIG. 8 is a view partly in section of the mechanism of FIG. 7 taken at right angles thereto.
Figure 7:
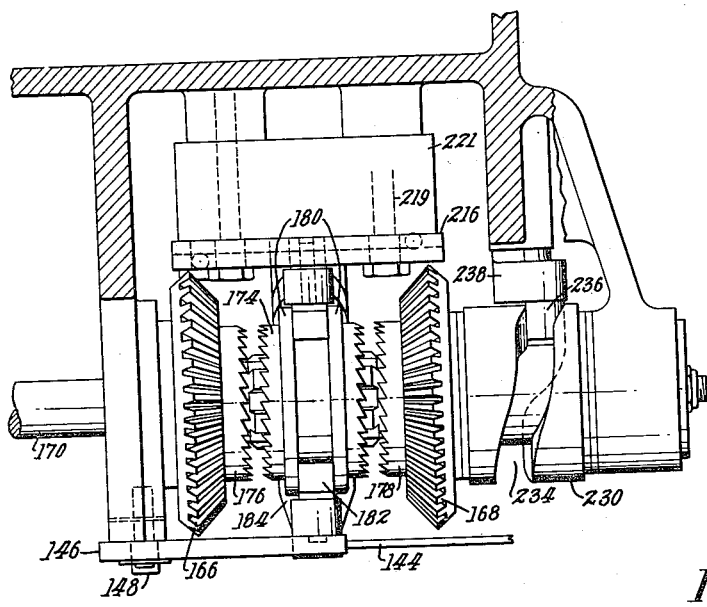
FIG. 7 is an elevation partly in section of the clutch-operating mechanism for the fuse cutter head.
Figure 10:
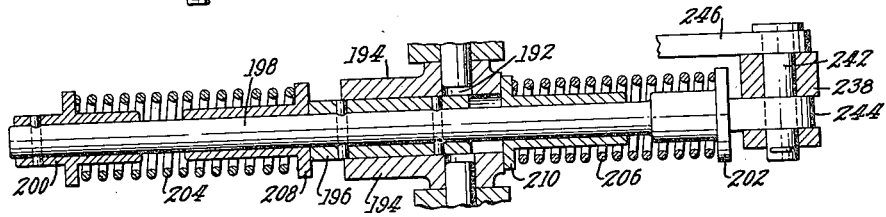
FIG. 10 is a section on the line X—X of FIG. 9.

With the fuse cutter head at rest and the parts in the positions shown in FIG. 7, the spring 206 is compressed between the abutments 202 and 210 as shown in FIGS. 8 and 10 and tends to move the sleeve 194 toward the left along the bushing 196. This movement is prevented by the latch 146 (FIG. 8) which engages a tail 212 on the lever 184. However, when this latch is moved in a clockwise direction, as viewed in FIG. 8, the spring 206 moves the sleeve 194 to the left moving the lever 184 in a counterclockwise direction, thereby causing movement of the clutch member 174 into the position shown in FIG. 11 in which the gear 168 is driven, thereby to move the shaft 170 in a direction to cause the fuse of the shell to be set.

Figure 9:
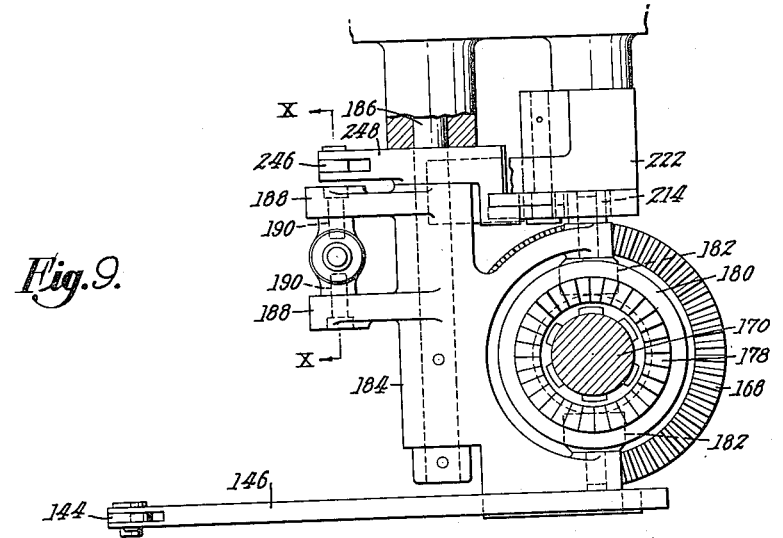
FIG. 9 is an end elevation partly in section of the mechanism shown in FIG. 8.

The lever 184 also carries a block 214 (FIGS. 9 and 11) received by a slot in a slidable plate 216 provided with slots into which extend pins 219 which are in turn carried by a support 221. The opposite ends of the plate 216 have projections providing shoulders with which cooperate latches 220, 222. These latches are urged downwardly toward the plate 216 by spring pressed plungers 224 and are provided with upwardly extending tails 226 by which the latches may be lifted by mechanism to be described, at predetermined times in the operation of the apparatus. When the clutch member 174 is moved into the position shown in FIG. 11, and with it the plate 216, the spring-pressed plunger 224 moves the latch 220 into locking engagement with the plate. Accordingly, the lever 184 is locked in the position shown and the gear 168 is driven through a predetermined angle of rotation when the latch 220 is lifted out of locking engagement with the plate 216 as will be described.

The shaft 170 carries a cam 230 having a cam track 234 in which is received a cam roll 236 carried by one end of a lever 238 pivoted at 240. The upper end of the lever carries a pin 242 which extends through an aperture in a projection 244 (FIG. 10) of the spring abutment 202 so that movement of the lever 238 by the cam 230 during rotation of the shaft 170 is communicated to the rod 198. The upper end of the lever 238 is also connected by the pin 242 to a link 246 which is in turn connected to a latch release arm 248 pivoted on the shaft 186. The arm 248 extends into a position between the tails 226 of the latches 220, 222 so that rocking movement of the arm 248 during the rotation of the shaft will cause release of the latches at predetermined times.

In the operation of this mechanism, after the clutch member 174 is moved into the position shown in FIG. 11, and the plate 216 is locked by the latch 220, the lever 238 starts to move in a clockwise direction. This causes movement of the rod 198 toward the right compressing the spring 204 between abutments 200, 208. The abutment 208 is in engagement with the left end of the sleeve 194 which is prevented from moving at this time by the connection of the lever 184 to the plate 216 which is locked in the position shown, until finally the latch release arm 248 has been moved far enough to engage the tail 226 of the latch 220 and move it out of locking engagement with the plate 216. As soon as this latch is thus released the spring 204 snaps the sleeve 194 to the right causing the lever 184 to be moved rapidly in a clockwise direction until the clutch member 174 engages the element 176 whereupon the bevel gear 166 is rotated by the gear 164 and the shaft 170 starts to turn in the opposite direction. This movement of the lever 184 causes the plate 216 to be moved to the left far enough to permit the latch 222 to be moved into locking engagement therewith, its tail at this time being out of engagement with the arm 248. As the shaft continues to turn the lever 238 is moved back toward the position shown in FIG. 11 thereby moving the rod 198 to the left causing the spring 206 again to be compressed. Upon movement of the shaft 170 to its starting position the arm 248 strikes the tail of the latch 222 freeing the plate 216 whereupon the spring 206 moves the lever 184 in a counterclockwise direction until it reaches the position shown in FIG. 8 in which position it is stopped by engagement of the tail 212 with the latch 146 which has been moved back into the position shown upon deenergization of the solenoid 138 (FIG. 1). Thus it will be seen that this mechanism operates the shaft in one direction through a predetermined angle of rotation then quickly reverses the direction of operation causing it to be turned back to its original position whereupon it is disconnected from the source of power. The rapid and positive action is made possible by the use of the springs 204, 206 and by the mechanism for compressing them at the appropriate times and then suddenly releasing them for action.

Figure 5:
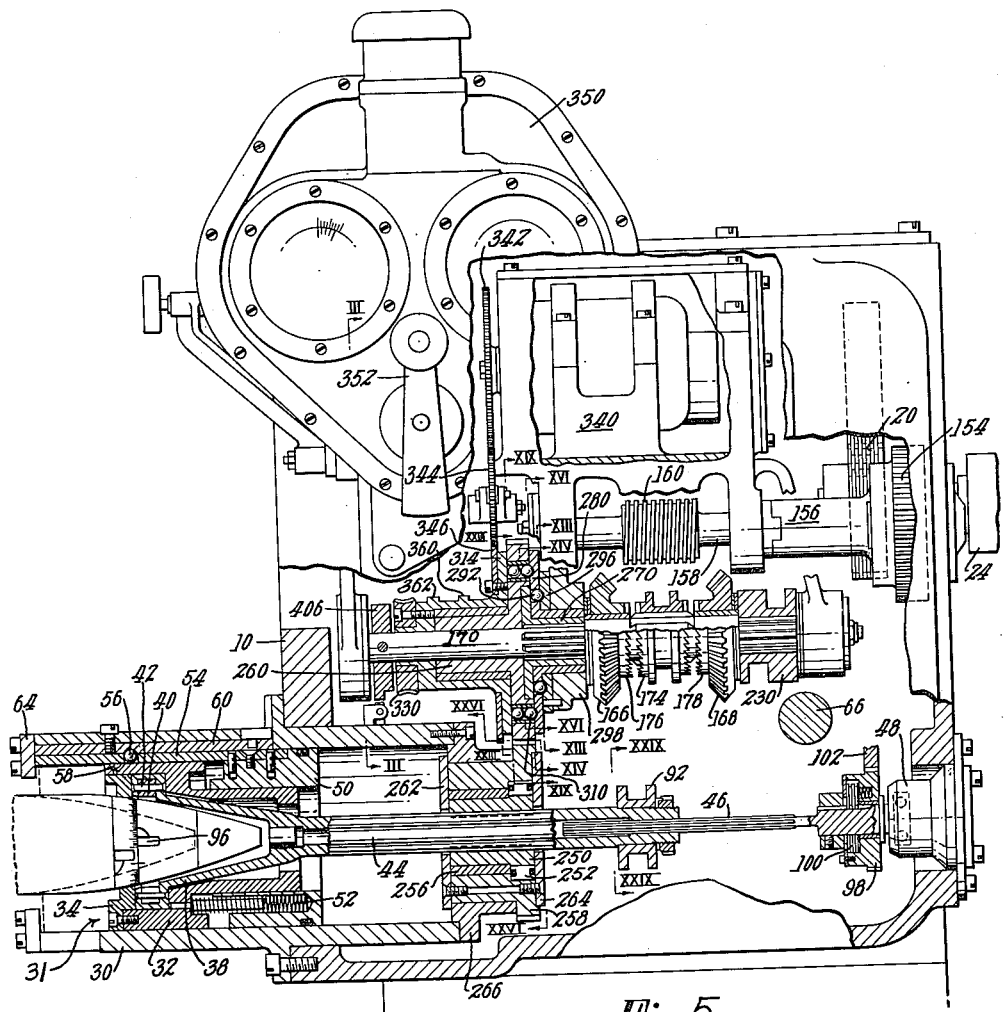
FIG. 5 is a section on the line V—V of FIG. 2.
Figure 6:
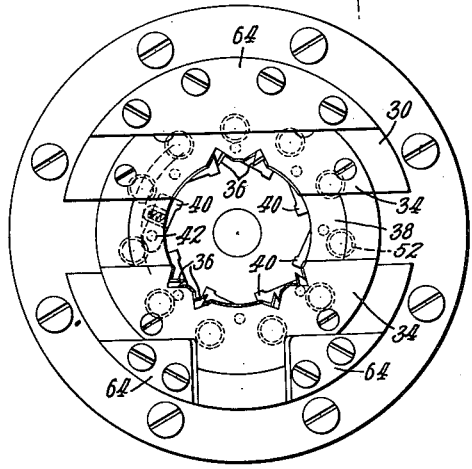
FIG. 6 is a front elevation of the fuse cutter head.
Figure 26:
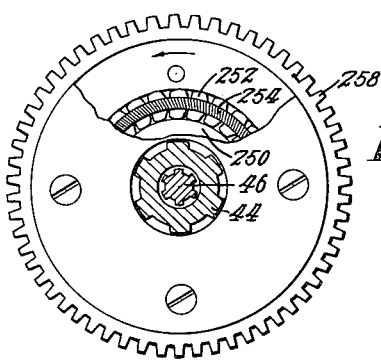
FIG. 26 is a section on the line XXVI—XXVI of FIG. 5.

The mechanism by which motion of the shaft 170 is transmitted to the shaft 44 includes a one-way clutch mechanism so that the shaft 44 is turned only when the shaft 170 is driven by the gear 168 but on the return movement of the shaft 170 no motion is transmitted to the shaft 44. This mechanism is illustrated in FIGS. 5 and 26 and includes a member 250 splined on the shaft 44. Surrounding the forward end of the member 250 are a plurality of clutch elements 252 provided in their forward and rearward faces with recesses to receive endless coil springs 254. A bushing 256 surrounds the rearward portion of the member 250 and journaled on this bushing is a gear 258 driven by a gear 260 on the shaft 170. End plates 262 and 264 are secured to the forward and rearward faces of the gear 258 to prevent relative axial movement of the gear and the clutch member 250 and to hold the clutch elements 252 in place between the gear and clutch member. The plate 262 and the gear 258 engage the opposite end faces of a plate 266 secured to the forward end of the support 30 thereby to prevent axial movement of the gear and clutch assembly.

The clutch and gear-engaging faces of the clutch elements are curved as illustrated in FIG. 26, the curvatures being such that power is transmitted from the gear to the member 250 only during movement of the gear in a counterclockwise direction as viewed in FIG. 26. Upon reverse movement of the gear no motion is transmitted to the clutch member through the elements 252 and accordingly the fuse cutter head rotates only in one direction. The clutch illustrated herein is of commercial construction and it will be understood that any suitable one-way clutch mechanism might be employed in its place.

As described above, during each cycle of operation the shaft 170 is turned a fixed amount in one direction and then turned back to its original position. In order that the extent of movement of the fuse cutter head may be varied within predetermined limits in order to obtain a predetermined fuse-setting time, mechanism is provided between the gear 258 and the shaft 170 for causing the gear to be turned through a readily variable predetermined angle during the movement of the shaft 170. This mechanism is best illustrated in FIGS. 5 and 13 to 25 inclusive.

Figures 16, 17:
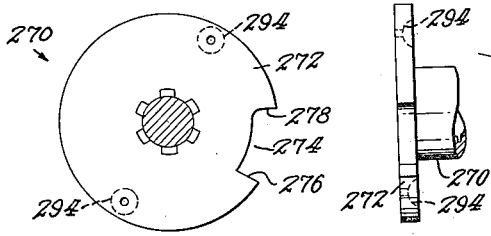
FIG. 16 is a section on the line XVI—XVI of FIG. 5, illustrating the drive member.
FIG. 17 is a view of the drive member of FIG. 16 taken at right angles thereto.
Figure 18:
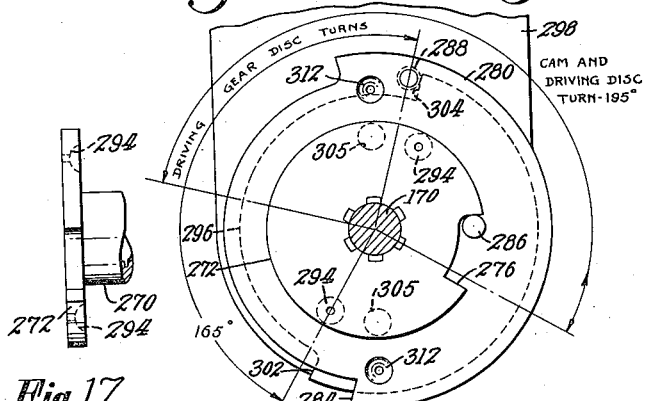
FIG. 18 is a view of the elements of FIGS. 13, 14 and 16 showing the relative positions of these elements at the start of the fuse-setting operation.
Figure 19:
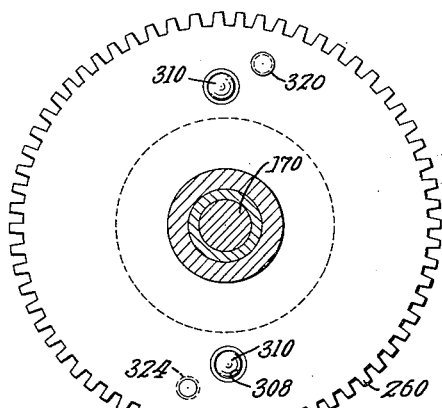
FIG. 19 is a section on the line XIX—XIX of FIG. 5, illustrating the driven member.
Figure 20:
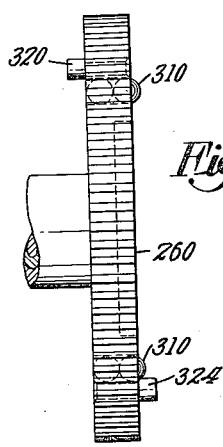
FIG. 20 is a view of the driven member of FIG. 19 taken at right angles thereto.

Fixed on the shaft 170 is a drive member 270 having a hub portion splined on the shaft and a flanged portion 272 which is circular as shown in FIG. 16 except for a recess 274 in its periphery which provides a pair of shoulders 276, 278. Journaled on the hub of the drive member 270 is a power transmitting disk 280 the face of which is located in contact with the forward face of the flange 272 of the drive member. This power transmitting disk is generally circular except for a cut away portion which provides a pair of shoulders 282, 284 for a purpose which will appear as the description proceeds. The disk 280 carries on its rearward face a pin 286 and on its forward face a pin 288. The pin 286 is located within the recess 274 of the drive member and provides for a certain amount of relative motion between the parts. The disk 280 is provided with a pair of apertures 290 in which are located balls 292 which are somewhat larger in diameter than the thickness of the disk 280. These balls are arranged to be received in recesses 294 in the drive member and are thus held during the fuse-setting operation by a fixed plate 296 carried by a supporting bracket 298 and located relatively thereby by dowels 300. As long as the plate 296 holds the balls carried by the power transmitting disk in engagement with the recesses in the drive member, the power transmitting disk and the drive member will turn as a unit. The pin 288 in the power transmitting disk is arranged to engage shoulders 302, 304 in the periphery of the plate 296 thereby to limit movement of the power transmitting disk in opposite directions. When the pin 288 engages either of these shoulders the balls 292 register with recesses 305 in the plate 296 for a purpose which will appear hereinafter.

The gear 260 by which the gear 258 on the shaft 44 is driven is journaled on the shaft 170 rearwardly of the drive member 270 and has a portion overlying the periphery of the flange 272 and in engagement with the power transmitting disk 280. The gear 260 is provided with a pair of holes 308 in each of which is seated a pair of balls 310 the combined diameters of each pair being greater than the thickness of the gear. The power transmitting disk 280 is provided with recesses 312 in which the adjacent balls may be seated so that when they are thus held, motion is transmitted from the drive member 270 through the disk 280 to the gear 260.

Figures 21, 22:
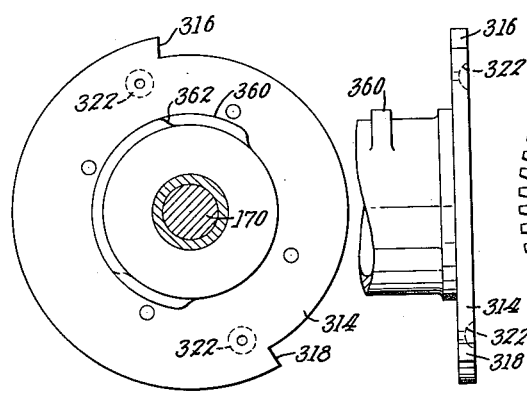
FIG. 21 is an elevation of the timing disk in its zero position.
FIG. 22 is a view of the timing disk of FIG. 21 taken at right angles thereto.

For thus holding the balls in the recesses in the power transmitting disk 280 for a readily variable time thereby to vary the extent of rotation of the gear 260, a timing disk 314 is provided. This disk, as shown in FIG. 21, has a pair of spaced shoulders 316, 318 in its periphery, the shoulder 316 being arranged to be engaged by a pin 320 in the rearward face of the gear 260 when the fuse has been set a predetermined amount. The timing disk 314 is provided in its forward face with recesses 322 which are so arranged with respect to the shoulder 316 that when the pin 320 engages the shoulder 316 and thereby prevents further movement of the gear 260, the balls 310 in the gear register with the recesses and may leave the recesses in the power-transmitting disk thereby to permit movement of the power-transmitting disk 280 relatively to the gear during the continued rotation of the shaft 170. The timing disk 314 is arranged to be adjusted relatively to the gear 260 thereby to adjust the movement of the gear during each operation of the shaft 170 and thus to control the time for which the fuse is set. Mechanism for thus adjusting the disk 314 will be described below.

Figure 23:
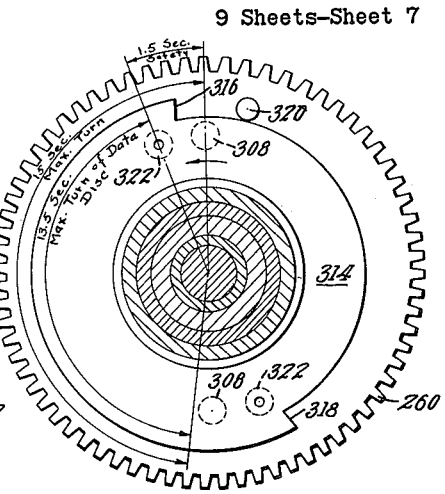
FIG. 23 is a view of the driven member of FIG. 19 and the timing disk of FIG. 21 showing the relative positions of the parts at the beginning of a fuse-setting operation but with the timing disk in its zero position.
Figure 24:
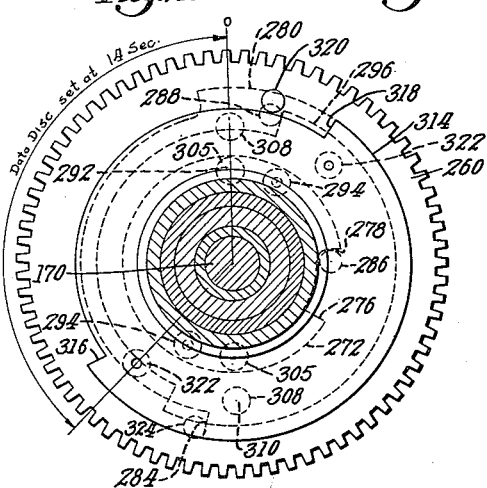
FIG. 24 is a view showing all the elements of the mechanism by which the operation of the fuse cutter head is controlled at the start of the fuse-setting operation with the timing disk turned to establish a predetermined fuse-setting time.
Figure 25:
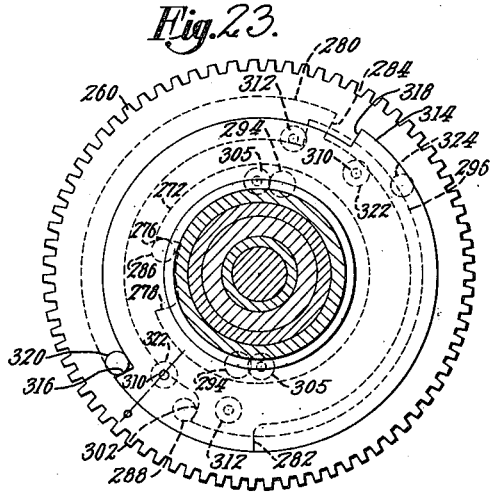
FIG. 25 is a view similar to FIG. 24 but showing the relative positions of the parts at the conclusion of the fuse-setting operation.

FIG. 23 shows the relative positions of the gear 260 and the timing disk 314 when the timing disk is in its zero position. In FIG. 24 the disk has turned in a counterclockwise direction from its zero position so that the fuse will be set for a predetermined time. Movement of the timing disk further in a counterclockwise direction increases the time for which the fuse is set whereas motion in a clockwise direction will decrease the time for which the fuse is set. Upon operation of the clutch member 174 and rotation of the shaft 170, the parts move from the positions shown in FIG. 24 into the relative positions shown in FIG. 25. The driving disk 272 which is keyed to the shaft turns relatively to the power transmitting disk 280 until the shoulder 276 in the disk 272 engages the pin 286 in the disk 280. During this first part of the movement of the driving disk the power transmitting disk is locked by the balls 292 to the disk 296. As soon, however, as the pin 286 is engaged by the shoulder 276 the balls 292 register with the recesses 294 in the driving disk and consequently the power transmitting disk is released from the disk 296.

The power transmitting disk at this time is coupled by the balls 310 to the gear 260 and consequently the shaft 44 is rotated to set the fuse of the shell. Rotation of the shaft 44 continues until the pin 320 carried by the gear 260 engages the shoulder 316 of the timing disk 314. Simultaneously with this, the balls 310 in the gear 260 register with recesses 322 in the timing disk and move out of driving engagement with the recesses 312 in the power transmitting disk so that this disk can turn relatively to the gear 260, and this motion continues until the pin 288 carried by the power transmitting disk engages the shoulder 302 in the plate 296. This occurs at the same time that the clutch member 174 is shifted to reverse the direction of rotation of the shaft 170. The driving disk 272 now starts to rotate back toward the position shown in FIG. 24 and because it is still coupled by the balls 292 to the power transmitting disk 280 this disk likewise starts to turn back toward its original position. After the parts have been turned a sufficient amount the shoulder 284 of the power transmitting disk engages a pin 324 on the forward side of the gear 260 thereby moving the gear with it. At the same time the balls 310 in the gear register with the recesses 312 in the power transmitting disk so that the gear may turn relatively to the timing disk 314. As explained heretofore, this reverse movement of the gear is not imparted to the shaft 44 of the fuse-setting mechanism because of the one-way clutch between the gear 258 and the shaft.

The parts turn in unison unitl the balls 292 in the power transmitting disk again register with the recesses 305 in the plate 296. At this time the clutch member 174 is shifted back into its neutral position as shown in FIG. 5 but the shaft 170 is permitted to coast to a stop, the driving member 270 being disconnected from the disk 280 when the balls 292 enter the recesses in the disk 296. Accordingly the driving disk moves relatively to the power transmitting disk until the shoulder 276 moves into engagement with the pin 286 in the power-transmitting disk whereupon the shaft and the driving disk come to a stop. It will thus be seen that whereas the shaft 170 turns a predetermined amount in one direction and then reversely back to its initial position the gear 260 turns a variably determined amount depending upon the setting of the timing disk 314.

Figure 28:
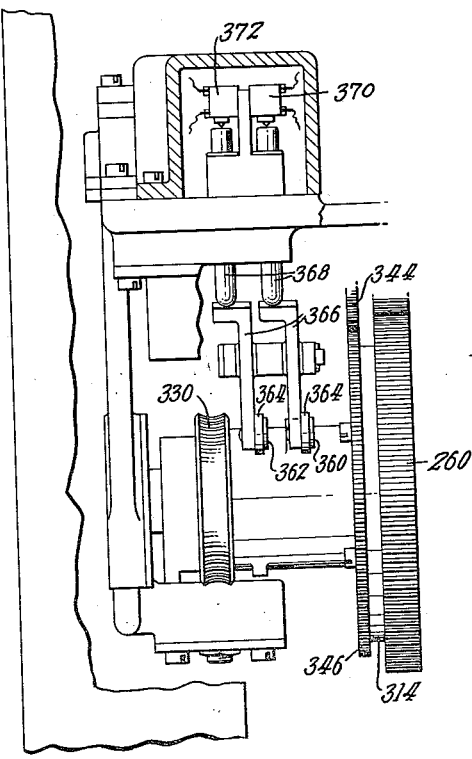
FIG. 28 is a view of the mechanism of FIG. 27 taken at right angles thereto.

For setting the position of the timing disk 314 a worm gear 330 (FIGS. 2, 5 and 28) is secured to its hub. This worm gear meshes with a worm 332 carried by a vertical shaft 334 which is connected by gearing 336 (FIG. 2) to an electric motor 338. This motor may be remotely controlled in any suitable manner to adjust the position of the timing disk in accordance with the position of the target. One form of mechanism which is suitable for this purpose is known as a self-synchronous transmission system including a self-synchronous transmitter and receiver. Such a receiver is indicated at 340 (FIG. 5) and consists of a motor connected by gears 342, 344, to a gear 346 secured to the timing disk 314. When the receiver 340 is in phase with the transmitter (not shown) the circuit to the motor 338 is open. However, if the transmitter is out of phase with the receiver then the circuit to the motor closes and the worm gear 330 is turned to adjust the position of the timing disk until it, through the gears 346, 344, 342, moves the receiver 340 back into phase with the transmitter. This type of a control system embodying the self-synchronous motors and the driving motor controlled thereby, is old and well known and since it forms no part of the present invention, it is not explained in more detail.

A manually-operated mechanism may also be provided for adjusting the position of the timing disk 314, this mechanism being illustrated at 350 (FIG. 5) and comprising a control handle 352 which may be turned to rotate bevel gears 354 (FIG. 2) which are connected by a shaft 356 and gearing 358 to the shaft 334 carrying the worm 332.

Figure 27:
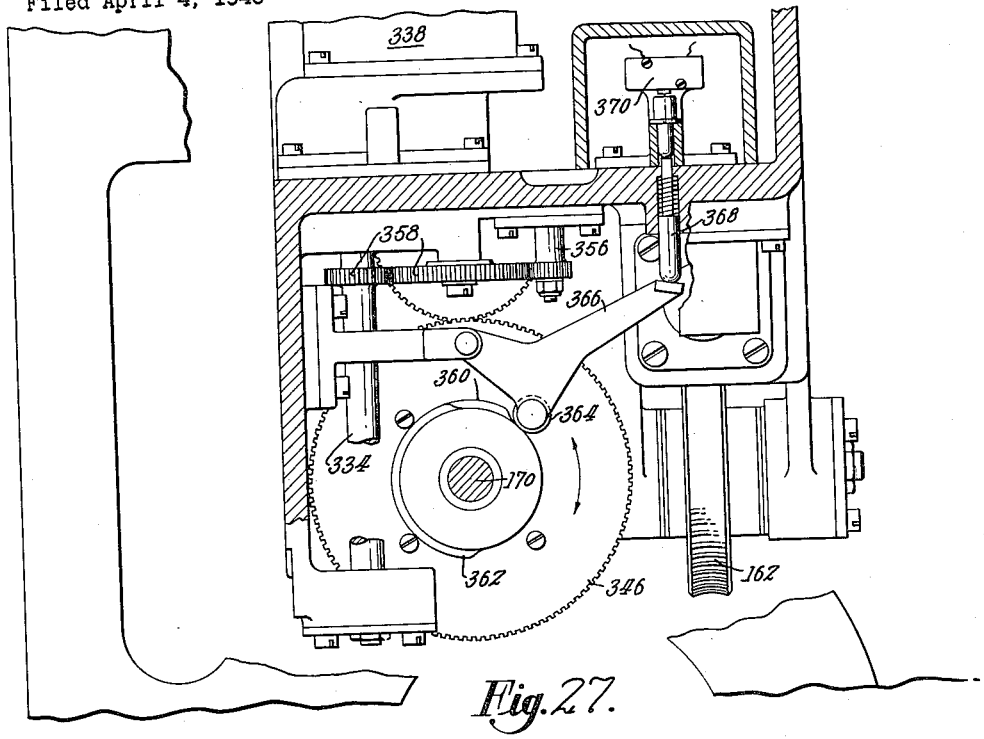
FIG. 27 is an end elevation partly in section of the control mechanism showing part of the electrical control devices.

In order to limit the extent of movement of the timing disk by the electric motor 338 the hub of the timing disk is provided with a pair of cams 360, 362 (FIGS. 5, 27 and 28) in engagement with each of which is a cam roll 364 carried by a switch actuating arm 366. These switch arms are held by spring-pressed plungers 368 (FIG. 27) with their cam rolls in engagement with the hub of the timing disk and act through the plungers 368 to open one of the switches 370, 372 when the timing disk has turned into its extreme positions. These switches, which are normally closed, are in the circuit to the motor 338 and consequently this motor is de-energized automatically should any attempt be made to turn the timing disk in either direction beyond predetermined positions.

Figure 12:
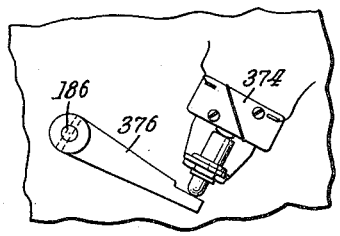
FIG. 12 is a detail view of one of the electrical control devices.
Figure 13:
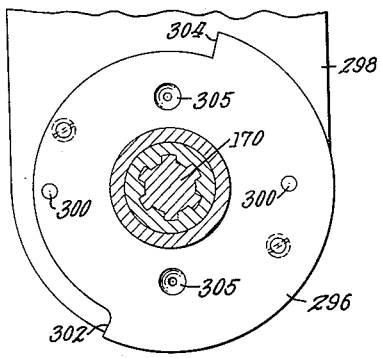
FIG. 13 is a section on the line XIII—XIII of FIG. 5.
Figure 14:
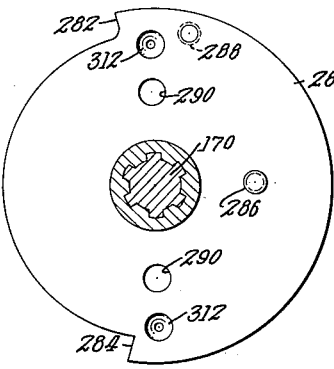
FIG. 14 is a section on the line XIV—XIV of FIG. 5 illustrating the power-transmitting disk.
Figure 15:
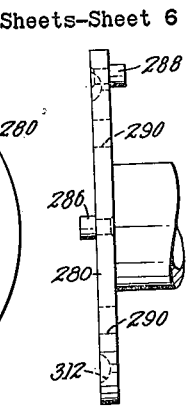
FIG. 15 is a view of the power-transmitting disk of FIG. 14 taken at right angles thereto.

Provision is made for preventing movement of the timing disk 314 during the fuse-setting operation. For this purpose a normally closed switch 374 (FIG. 12) is included in the circuit to the motor 338 (FIG. 2), this switch being arranged to be opened by an arm 376 carried by a reduced upper extension of the shaft 186. Upon movement of the latch 146 (FIG. 8) in a clockwise direction to permit engagement of the clutch elements 174, 178 (FIG. 11) the arm 376 is moved into the position shown in FIG. 12 in which position the switch 374 is opened, thereby to prevent operation of the motor 338 and further adjustment of the timing disk thereby during the fuse-setting operation. By the time that the lever 184 is operated to move the clutch member 174 into engagement with the clutch element 176 the fuse is set and consequently the closure of the switch 374 by movement of the arm 376 away therefrom will not affect the fuse-setting operation.

After the fuse-setting operation has been completed the clutch 16 (FIG. 1) is engaged thereby to cause loading of the shell by mechanism such as that illustrated and described in the aforementioned Finn application. The clutch is engaged by movement of an arm 380 in a clockwise direction, this arm being connected to the clutch in any suitable manner as by the mechanism illustrated in the Finn application. The arm 380 is normally held in the position shown in FIG. 1 by a spring 382. A link 384 connects the arm 380 with a bell crank lever 386 (FIG. 4) pivoted at 388 to a bracket 390. The other arm of the bell crank lever is connected by a downwardly extending link 392 to a lever 394 pivoted on a pin 396 and provided on its right hand end with an upwardly extending arm 398. This arm is pivoted to the lever 394 at 400 and is held against a pin 402 by a spring-pressed plunger 404. The arm 398 is in the path of a cam 406 carried by the rearward end of the shaft 170 (FIG. 5). The arrangement is such that upon rotation of the cam 406 in a counterclockwise direction as viewed in FIG. 3, which is the direction of rotation of the shaft 170 during the fuse-setting operation, the arm 398 is moved about the pivot 400 against the force exerted by the spring-pressed plunger 404 but no movement is imparted thereby to the lever 394. After the fuse is set, however, and the shaft turns in a clockwise direction the cam acts through the arm 398 to move the lever 394 about the pivot 396 and through the connections heretofore described to move the arm 380 (FIG. 1) in a direction to engage the clutch.

The cycle of operations starts with the fuse-setting elements in engagement with the nose of the shell as shown in FIG. 5, one of the pawls 40 carried by the support 38 being located within the recess 96 of the fuse ring. The timing disk 314 is operated either by the motor 338 or by the mechanism 350 to set the disk in accordance with the position of the target thereby to obtain a predetermined setting of the fuse ring. When this disk has been properly adjusted and it is desired to fire the gun the solenoid 138 (FIG. 1) is energized thereby to move the latch 146 to permit movement of the clutch member 174 into engagement with the clutch element 178 thereby turning the shaft 170. This shaft turns through a predetermined angle during a portion of which motion is imparted to the gear 260 through the mechanism shown in FIGS. 5, 11 to 25, so that the shaft 44 is turned an amount corresponding to the position in which the timing disk has been set. This causes the fuse ring to be turned relatively to the rest of the shell which is held against turning movement by the knives 36. After the shaft 170 has turned a predetermined amount in one direction the clutch member 174 is shifted thereby to cause the shaft 170 to return to its initial position. The reverse rotation of the gear 260 does not cause any motion of the shaft 44 because the one-way clutch 252 transmits motion only during the rotation of the gear 258 in one direction.

The pawl 116 (FIG. 32) at this time is in engagement with the ratchet 112 so as to lock the carriage 32 of the fuse cutter head against rearward movement. At a predetermined time in the reverse movement of the shaft 170 the cam 406 (FIG. 3) causes engagement of the clutch 16 (FIG. 1) thereby to initiate operation of the loading mechanism which withdraws the shell from the fuse cutterhead and loads it in the gun as described in the Finn application. Engagement of the clutch 16 causes rotation of the cam shaft 66 which moves the shaft 44 forwardly to permit entrance of another shell into fuse-setting position in the support 30 after which the shaft 44 is again moved rearwardly, first by its connection to the cam shaft and finally, after it has moved a predetermined distance, by the spring 52 which snaps the head rapidly onto the nose of the shell, this mechanism permitting proper engagement with the nose of the shell regardless of the length of shell within certain limits. The shells illustrated in FIG. 1 illustrate the relative differences of the lengths of shells which may be operated upon by the present apparatus and consequently the positions of their noses lengthwise relatively to the fuse-setting apparatus.

Following the engagement of the nose of the shell by the fuse cutter head the segment 102 is operated to turn the shaft 44 until one of the pawls 40 engages the recess 96 in the fuse ring. The friction disks 100 then slip under the load imposed by the resistance of the fuse ring to turning so that, whereas the segment 102 moves through a fixed predetermined angle, the shaft 44 will turn only far enough to cause proper positioning of the pawl support 38 will respect to the shell. The fuse-setting apparatus now comes to rest, this being the end of the cycle of operations as far as this particular part of the apparatus is concerned.

Having thus described the invention what I claim as new and desire to secure by Letters Patent of the United States is:

1. In combination, a work-engaging member movable from an initial position into one of a plurality of operative positions toward and into engagement with a workpiece to be operated upon, positive means for moving said member toward operative position, spring means operable after a movement of fixed predetermined extent of said member by said positive means for completing the movement of said member, and means for thereafter connecting said member to the first named mens to return the member to initial position.

2. In combination, a work-engaging member movable from an initial position into one of a plurality of operative positions toward and into engagement with a workpiece to be operated upon, means for moving said member into engagement with a workpiece including positive drive means and spring means, means rendering said spring means ineffective until said member has been moved a fixed predetermined amount by said positive drive means, and means operative after movement of said member by said spring means for connecting the member to the positive drive means to return the member to its initial position.

3. In combination, a work-engaging member movable into one of a plurality of operative positions in accordance with the position of a workpiece to be operated upon, means for moving said member into engagement with a workpiece including positive drive means and spring means, means rendering said spring means ineffective until said member has been moved a predetermined amount by said positive drive means, and means effective only after said work-engaging member has come to rest in engagement with said workpiece for locking said member against further movement by said spring means when said workpiece is withdrawn therefrom.

4. In combination, a rotatable work-engaging member, means mounting said member for rectilinear movement toward and from a workpiece, means for moving said work-engaging member into engagement with a workpiece including positive drive means and spring means, means rendering said spring means ineffective until said member has been moved a predetermined amount by said positive drive means, and means for thereafter turning said work-engaging member.

5. In combination, a work-engaging member, means supporting said member for rectilinear movement toward and away from a workpiece, power-operated means for moving said member toward said workpiece a predetermined amount, a spring retainer guided for movement in said support with said work-engaging member and locked to said member, a spring between said retainer and said work-engaging member for urging said work-engaging member toward said workpiece, and means operative after a movement of predetermined extent of said work-engaging member by said power-operated means for releasing said work-engaging member from said retainer and locking said retainer against movement relatively to said support.

6. Apparatus for operating on workpieces comprising a head having a work-holding member and a rotatable work-engaging member, means mounting said head for movement in rectilinear path toward and away from a workpiece, power-operated means for moving said head a predetermined distance toward said workpiece, spring means for completing movement of said head into engagement with the workpiece, and means for thereafter turning the rotatable work-engaging member relatively to said work-holding member.

7. Apparatus for operating on workpieces comprising a head having work-gripping means and a rotatable work-engaging member arranged for engagement with a shoulder on the workpiece for turning one portion of the workpiece relatively to the other, means mounting said head for movement in a rectilinear path toward and away from the workpiece, power-operated means for moving said head a predetermined distance toward said workpiece, spring means for completing movement of said head thereby to force the gripping member into locking engagement with the workpiece, means for turning the work-engaging member relatively to said workpiece until the shoulder on the workpiece is engaged thereby, and other means for thereafter turning the work-engaging member to turn said one portion of the workpiece a predetermined amount relatively to the other.

8. Fuse-setting apparatus comprising a fuse cutter head movable into and out of engagement with the nose of a shell, positive drive means for moving said head a portion of the distance toward the shell, and spring means for completing said movement.

9. Fuse-setting apparatus comprising a fuse cutter head movable into and out of engagement with the nose of a shell, spring means urging said head toward fuse-setting position in engagement with the nose of a shell, drive means for moving said head toward fuse-setting position, and means rendering said spring means ineffective until the drive means has moved said head a predetermined distance toward fuse-setting position.

10. Fuse-setting apparatus comprising a fuse cutter head movable rectilinearly into and out of engagement with the nose of a shell, and means for moving said fuse cutter head into and out of operative position, said means comprising positive drive means for moving said head a portion of the distance from inoperative to operative position, and spring means for completing the movement into operative position.

11. Fuse-setting apparatus comprising a fuse cutter head movable rectilinearly into and out of engagement with the nose of a shell, means for moving said head into and out of operative position, said means comprising spring means and positive drive means, and means rendering said spring means ineffective until the drive means has moved said head into a predetermined position.

12. Fuse-setting apparatus comprising a fuse cutter head movable into engagement with the nose of a shell positioned coaxially relatively thereto, said head including means engageable with the nose of a shell to hold it against rotation and a rotatable member engageable with the fuse ring of the shell, means including spring means for moving said head into engagement with the nose of the shell, means for turning said rotatable member a predetermined amount, and means effective only after said head has come to rest in engagement with the nose of the shell for locking said member against further movement by said spring means when the shell is withdrawn from the head.

13. Fuse-setting apparatus comprising a fuse cutter head movable rectilinearly into and out of engagement with the nose of a shell, means for moving said fuse cutter head into and out of operative position, said means comprising positive drive means for moving said head a portion of the distance from inoperative to operative position, spring means for completing the movement of the head into operative position, and means for subsequently preventing further movement of said head under the influence of said spring means.

14. Fuse-setting apparatus comprising a splined shaft, a fuse cutter head carried thereby, a gear supporting said splined shaft, power-operated means for moving said fuse cutter head and shaft toward the nose of a shell, spring means for additionally moving said head and shaft, means rendering said spring means ineffective until the head and shaft have been moved into a predetermined position by said power-operated means, said head including a rotatable member, means for rotating said shaft to carry said member into driving relationship with the fuse ring of the shell, and means for then turning the gear a predetermined amount.

15. Fuse-setting apparatus comprising a splined shaft, a fuse cutter head carried thereby, a gear supporting said splined shaft, power-operated means for moving said fuse cutter head and shaft toward the nose of a shell, spring means for additionally moving said head and shaft, means rendering said spring means ineffective until the head and shaft have been moved into a predetermined position by said power-operated means, said head including a rotatable member, means for rotating said shaft to carry said member into driving relationship with the fuse ring of the shell, means for then turning the gear a predetermined amount, and means for locking said head in position against the force exerted by said spring to enable removal of the shell therefrom.

16. Fuse-setting apparatus comprising a splined shaft, a fuse cutter head carried thereby, a gear supporting said splined shaft, power-operated means for moving said fuse cutter head and shaft toward the nose of a shell, spring means for additionally moving said head and shaft, means rendering said spring means ineffective until the head and shaft have been moved into a predetermined position by said power-operated means, said head including a rotatable member, means for rotating said shaft to carry said member into driving relationship with the fuse ring of the shell, means controlled by said last-named means for locking said head in position against the force exerted by said spring to enable removal of a shell from the head at the conclusion of the fuse-setting operation, and means for turning said gear a predetermined amount after said number is in driving relationship with the fuse ring of the shell.

References Cited in the file of this patent

UNITED STATES PATENTS

| Number | Name | Date |
|---|---|---|
| 632,094 | Browning | Aug. 29, 1899 |
| 1,209,451 | King | Dec. 19, 1916 |
| 1,693,661 | Ogden | Dec. 4, 1928 |
| 1,898,081 | Dabrasky | Feb. 21, 1933 |
| 2,040,601 | Dunn | May 12, 1936 |
| 2,135,005 | Hoagland et al. | Nov. 1, 1938 |
| 2,251,491 | Lozen | Aug. 5, 1941 |
| 2,297,106 | LeTourneau | Sept. 29, 1942 |
| 2,353,816 | Dodge et al. | July 18, 1944 |
| 2,374,179 | Delalande | Apr. 24, 1945 |